US012711014B2

(12) United States Patent
Chen et al.

(10) Patent No.: US 12,711,014 B2
(45) Date of Patent: Aug. 18, 2026

(54) NETWORK HEALTH SERVICES AND LIFECYCLE CORRECTNESS

(71) Applicant: Snowflake Inc., Bozeman, MT (US)

(72) Inventors: Libo Chen, San Carlos, CA (US); Eddie Hao, Palo Alto, CA (US); Daniel Geoffrey Karp, San Carlos, CA (US); Themistoklis Melissaris, San Bruno, CA (US); Sai Bhargav Varanasi, San Mateo, CA (US); Yuanfeng Wen, Sunnyvale, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/939,968

(22) Filed: Nov. 7, 2024

(65) Prior Publication Data

US 2026/0127076 A1 May 7, 2026

(51) Int. Cl.

| | |
|---|---|
| ***G06F 11/00*** | (2006.01) |
| ***G06F 9/38*** | (2018.01) |
| ***G06F 9/54*** | (2006.01) |
| ***G06F 11/07*** | (2006.01) |
| ***G06F 11/14*** | (2026.01) |
| *G06F 11/16* | (2006.01) |

(52) U.S. Cl.

CPC ........ *G06F 11/1438* (2013.01); *G06F 9/3869* (2013.01); *G06F 9/547* (2013.01); *G06F 11/0757* (2013.01); *G06F 11/1435* (2013.01); *G06F 11/1604* (2013.01)

(58) Field of Classification Search

None

See application file for complete search history.

(56) References Cited

U.S. PATENT DOCUMENTS 10,423,493 B1 * 9/2019 Vig .................... G06F 11/1471
11,714,737 B2 * 8/2023 Neal-Joslin .............. G06F 1/14 713/502
12,468,588 B1 * 11/2025 Bhat ................. H04W 52/0206
2019/0056972 A1 * 2/2019 Zhou ...................... G06F 11/30
2019/0294711 A1 * 9/2019 Castro ................ G06F 11/1474
2022/0291850 A1 * 9/2022 Reed .................... G06F 9/5077
2022/0391291 A1 * 12/2022 Helland ............. G06F 16/2379
2023/0108121 A1 * 4/2023 Feinman ................ G06F 1/163 370/503
2023/0300056 A1 * 9/2023 Bandemer ............ G06F 9/5077 709/224
2025/0348341 A1 * 11/2025 Lafser ................ G06F 9/45558

OTHER PUBLICATIONS

Timekeeping in VMware Virtual Machines (Year: 2008).*

(Continued)

*Primary Examiner* — Bryce P Bonzo
*Assistant Examiner* — Gabriella Kanani Shelton
(74) *Attorney, Agent, or Firm* — Schwegman Lundberg & Woessner, P.A.

(57) ABSTRACT

Monitoring health metrics of computing devices in a data system can be implemented at different levels. At a first level, local background services can be run locally on the computing devices to monitor a set of health metrics on the respective computing devices. At a second level, a central health marker service can monitor a set of health metrics for the computing devices.

18 Claims, 5 Drawing Sheets

(56) References Cited

OTHER PUBLICATIONS

AWS WAF, “Applying rate limiting to requests in AWS WAF”, [Online]. Retrieved from the Internet: <https://docs.aws.amazon.com/waf/latest/developerguide/waf-rule-statement-type-rate-based-request-limiting.html>, (Accessed online Feb. 25, 2026), 3 pages.
Corbett, James C, et al., “Spanner Googles Globally Distributed Database”, ACMTransactions on Computer Systems, vol. 31, No. 3, Article 8, [Online] Retrieved from the internet: <https://storage.googleapis.com/gweb-research2023-media/pubtools/1974.pdf>, (Aug. 2013), 22 pages.
Ghobadi, Monia, et al., “Trickle Rate Limiting YouTube Video Streaming”, 2012 USENIX Annual Technical Conference, (Jun. 2012), 6 pages.
Melissaris, Themis, et al., “Elastic Cloud Services Scaling Snowflakes Control Plane”, SoCC 2022, (Nov. 2022), 16 pages.
Meta, “Making Our Network Clocks More Precise for the Metaverse”, [Online] Retrieved from the internet: <https://about.fb.com/news/2022/11/introducing-precision-time-protocol-to-metas-networks/>, (Nov. 21, 2022), 5 pages.
Microsoft Learn, “Limit Call Rate by Subscription”, [Online] Retrieved from the internet: <https://learn.microsoft.com/en-us/azure/api-management/rate-limit-policy>, (Accessed online Feb. 25, 2026), 5 pages.
Raghavan, Barath, et al., “Cloud control with distributed rate limiting”, [Online] Retrieved from the internet: <https://dl.acm.org/doi/pdf/10.1145/1282380.1282419>, (Aug. 27, 2007), 13 pages.

* cited by examiner

NETWORK HEALTH SERVICES AND LIFECYCLE CORRECTNESS

TECHNICAL FIELD

Embodiments of the disclosure relate generally to cloud data platforms and, more specifically, to managing health services and lifecycles of computing instances in a network-based data system.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

The data platforms may include a plurality of computing instances, such as virtual machines. The computing instances can suffer from different health concerns, such as high central processing unit (CPU) utilization and clock drift.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

A network-based data system, as described in detail below, may include a plurality of computing devices. Monitoring and managing the health of the computing devices can be difficult. Computing devices can fail due to health issues, such as high CPU usage, memory usage, and clock drift.

Techniques for monitoring different health metrics of computing devices in a data system are described herein. The monitoring can be implemented at different levels. At a first level, local background services can be run locally on the computing devices to monitor a set of health metrics on the respective computing devices. At a second level, a central health marker service can monitor a set of health metrics for the computing devices. Also, techniques for recovering failed computing devices are described below. The recovery techniques can include remote recovery that can mitigate data corruption, such as metadata corruption.

Actively monitoring different health metrics and managing computing devices in a distributed data system improves the technical performance and efficiency of the data system. Unhealthy devices can also lead to data corruption. Therefore, active management of the computing device based on health metrics can mitigate data corruption and ensure data accuracy.

Figure 1:
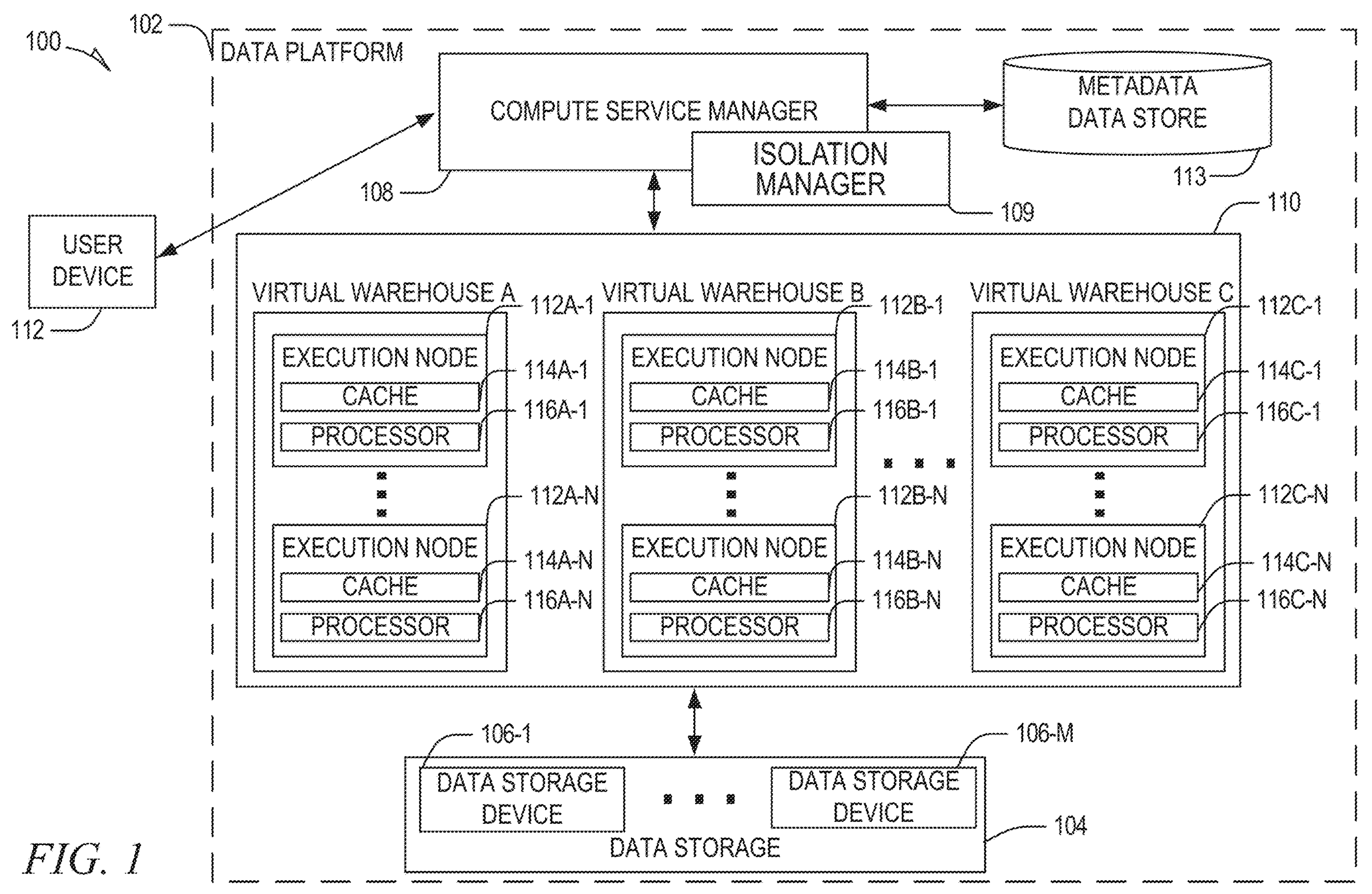
FIG. 1 illustrates an example computing environment that includes a cloud data platform, in accordance with some embodiments of the present disclosure.

FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 113 (also referred to as metadata database), an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines and provides on-demand computer system resources such as data storage and computing power to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

As shown, the compute service manager 108 includes an isolation manager 109 that is responsible for monitoring various health metrics associated with the compute service manager 108 and isolating the compute service manager 108 if needed based on the monitored health metrics. Further details regarding the functionality of the isolation manager 109 are discussed below.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 113 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 113, execution platform 110, and data storage 104 are shown in FIG. 1 as individual discrete components. However, each of the compute service manager 108, metadata data store 113, execution platform 110, and data storage 104 may be implemented as a distributed system (e.g., distributed across multiple systems/platforms at multiple geographic locations). Additionally, each of the compute service manager 108, metadata data store 113, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

Figure 2:
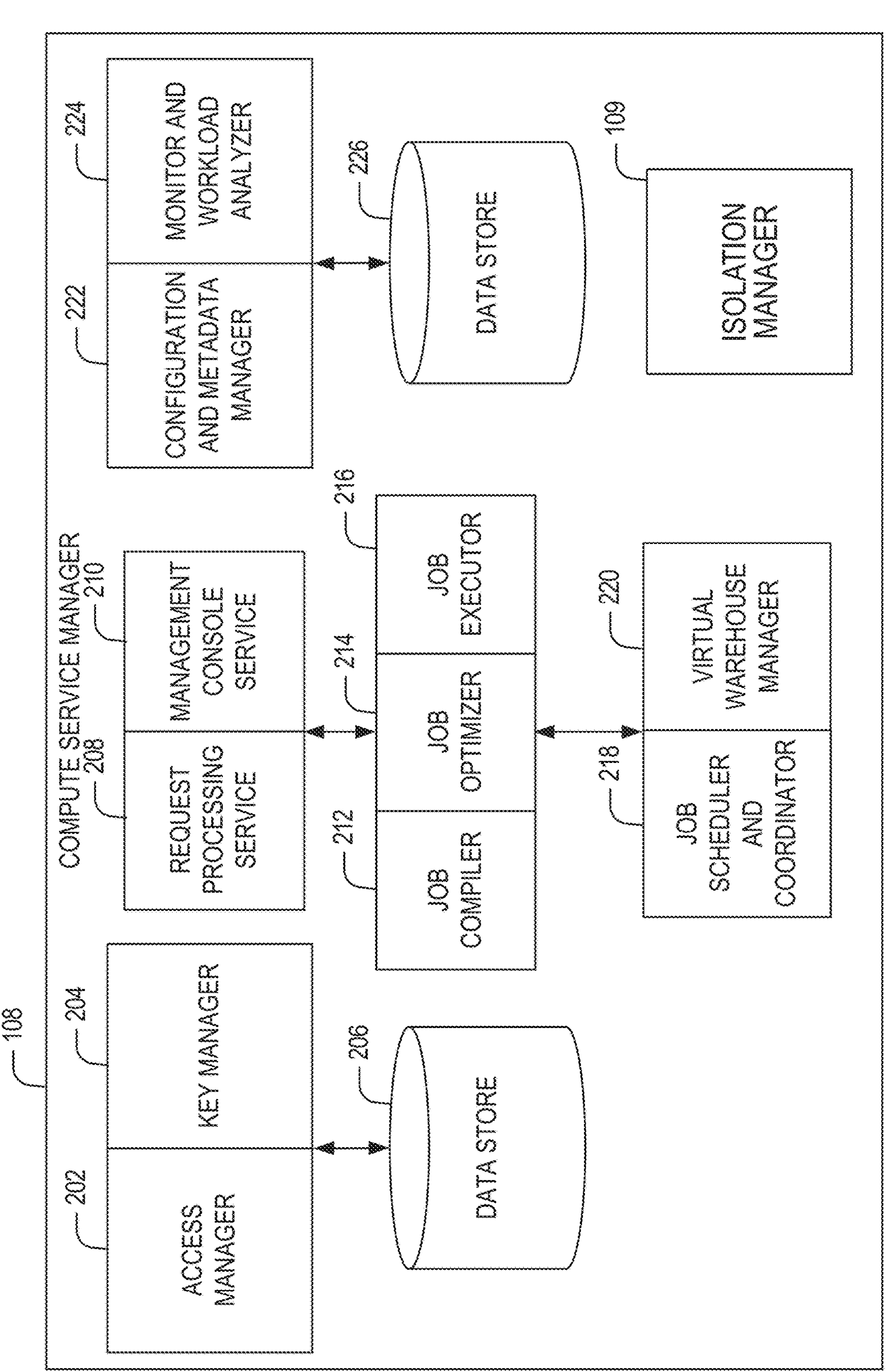
FIG. 2 is a block diagram illustrating components of a compute service manager of the cloud data platform, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 113, or any other storage device or system.

In addition, as mentioned above, the compute service manager 108 includes an isolation manager 109 that is responsible for monitoring various health metrics associated with the compute service manager 108 and isolating the compute service manager 108 if needed based on the monitored health metrics. Further details regarding the functionality of the isolation manager 109 are discussed below.

In some examples, compute service managers may be organized in clusters. The clusters may be assigned to a respective account in a multi-tenant data system. For example, cluster 1 may be assigned to Account A, and cluster 2 may be assigned to Account B. In some examples, an account may have multiple assigned accounts. For example, Account A may have cluster 1 and cluster 3 assigned.

Compute service managers and other computing devices in the data system may suffer from health issues during operation. For example, compute service managers may suffer from issues, such as high CPU utilization, high memory usage, clock drift.

Next, techniques for monitoring different health metrics of computing devices in a data system are described. The monitoring can be implemented at different levels. At a first level, local background services can be run locally on the computing devices to monitor a set of health metrics on the respective computing devices. At a second level, a central health marker service can monitor a set of health metrics for the computing devices. Also, techniques for recovering failed computing devices are described below. The recovery techniques can mitigate data corruption, such as metadata corruption.

Figure 3:
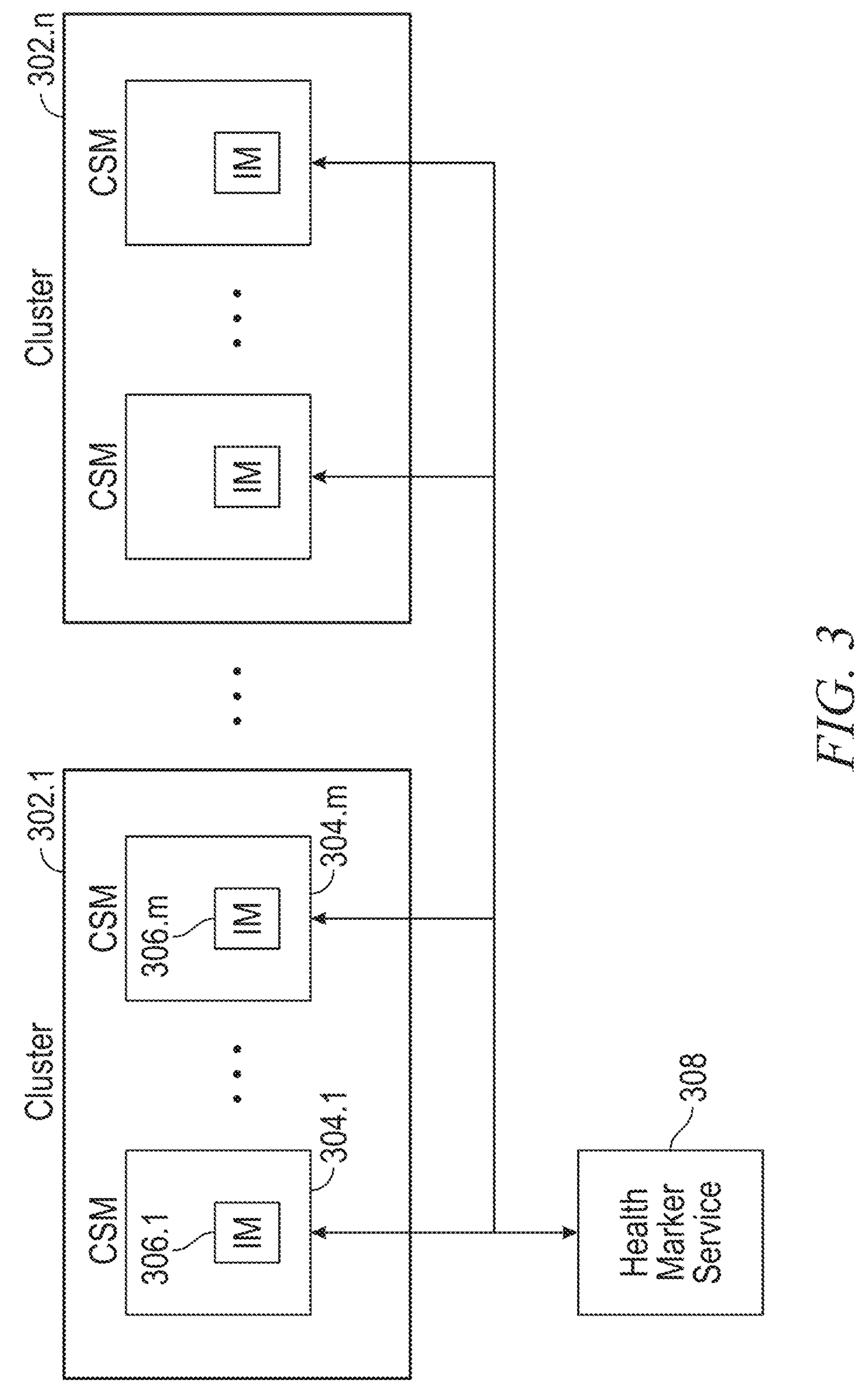
FIG. 3 is a block diagram illustrating components of a framework for health monitoring and recovery services, in accordance with some embodiments of the present disclosure.

FIG. 3 is a block diagram illustrating components of a framework 300 for health monitoring and recovery services, in accordance with some embodiments of the present disclosure. The framework 300 includes a plurality of clusters 302.1-302.*n*. The respective clusters may include a plurality of compute service managers. For example, cluster 302.1 may include a plurality of compute service managers 304.1-304.*m*. The framework 300 may also include a free pool (not shown) of compute service managers that can be added to clusters.

As relevant to health monitoring and recovery aspects, respective compute service managers 304.1-304.*m* include an isolation managers 306.1-306.*m*. For example, the isolation manager 306.1 monitors local health metrics of compute service manager 304.1.

In some examples, the isolation manager 306.1 may set threshold checks for CPU utilization and memory usage. The isolation manager 306.1 may also detect local clock drift in the compute service manager 304.1. For example, the isolation manager 306.1 may check the status of a network time protocol (NTP) service running in the compute service manager 304.1. An asynchronous, periodic trigger may be set up to check the status of the local NTP service.

Based on results of the NTP check, the isolation manager 306.1 may decide whether the NTP service is misconfigured in the compute service manager 304.1. If the NTP service is determined to be misconfigured, the isolation manager 306.1 may isolate the compute service manager 304.1. For example, the isolation manager 306.1 may trigger recycling operations for the compute service manager 304.1, because NTP misconfiguration is typically not correctable by restarting the compute service manager 304.1. Recycling operations may include shutting down the underlying virtual machine (compute service manager 304.1) and releasing the machine back to the cloud provider. The computing device may be deemed unfixable by the data system.

The framework 300 also includes a health marker service 308. The health maker service 308 may be provided as a distributed service coupled to the computing devices in the data system, such as compute service managers (e.g., compute service managers 304.1-304.*m*) in the different clusters (e.g., clusters 302.1-302.*n*). The health marker service 308 may monitor different conditions of the compute service managers, such as CPU and memory utilization and clock drift.

The health marker service 308 may check the outputs of respective compute service managers on a periodic basis for clock drift. For example, the health marker service 308 may check the outputs of the respective compute service manager every fifteen minutes or so. In some examples, the health marker service 308 may monitor timestamps attached to the outputs of the respective compute service managers and may compare the time on the timestamps to a reference clock.

The health marker service 308 may utilize different thresholds for determining clock drift. The health marker service 308 may utilize a first threshold for clock drifts in the past and a second threshold for clock drifts in the future. For example, the health marker service 308 may set up a first threshold of 2 minutes for clock drifts in the past, such that timestamps with value of greater than 2 minutes in the past are flagged as an exceeding clock drift. In the same example, the health marker service 308 may set up a second threshold of 30 seconds for clock drifts in the future, such that timestamps with a value of greater than 30 seconds in the future are flagged as an exceeding clock drift.

When the health marker service 308 flags a compute service manager as exceeding clock drift based on the one or more thresholds, the health marker service 308 may trigger recycling operations for the respective compute service manager.

When a clock of computing device, such as a compute service manager, drifts, it can have adverse effects. For example, a clock drift in the future can have an impact on multiple levels from incorrectly considering heartbeats of other compute service managers as stale to persisting jobs with future timestamps (e.g., correctness issues). By identifying and isolating computing devices with future heartbeats, the data system can mitigate such adverse impacts.

Figure 4:
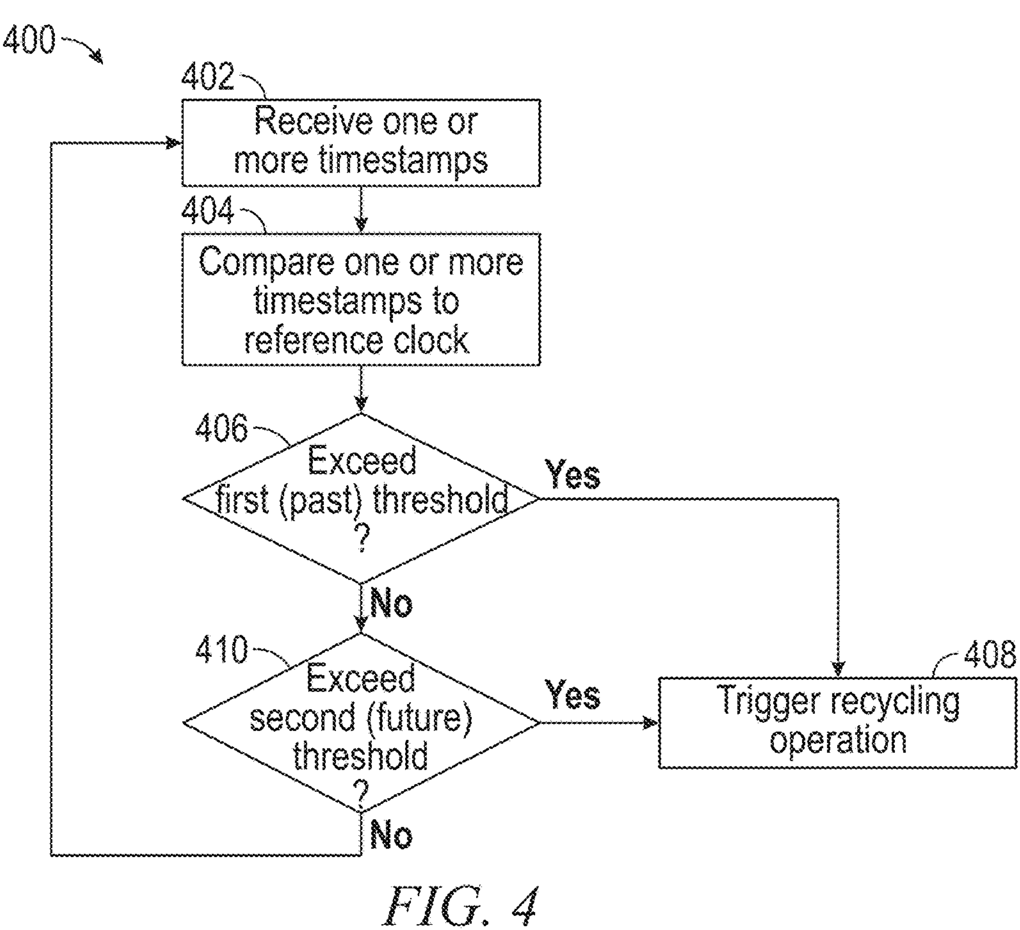
FIG. 4 is a flow diagram for a method for detecting clock drift, according to some example embodiments of the present disclosure.

FIG. 4 is a flow diagram for a method 400 for detecting clock drift, according to some example embodiments of the present disclosure. In some examples, the method 400 may be executed by a health marker service 308, as described above with reference to FIG. 3. Method 400 is described in terms of detecting clock drift in a respective compute service manager for illustrations purposes, and method 400 may be performed for each compute service manager in the data system as described above.

At operation 402, one or more timestamps from a compute service manager is received. For example, the health marker service may retrieve timestamps associated with outputs from the compute service manager in a current time interval (say, last 15 minutes). In some examples, the health marker service may retrieve the timestamps from a metadata database in the data system. That is, the respective compute service manager may have written the timestamps and other metadata associated with the relevant outputs in the metadata database, and the health marker service may retrieve the information from the metadata database at the scheduled time.

At operation 404, the one or more timestamps are compared to a reference clock. For example, the health marker service may compare the one or more timestamps to a master clock associated with the data system.

At operation 406, the health marker service determines whether the one or more timestamps exceed a first threshold associated with clock drift in the past. For example, the health marker service may determine whether the one or more timestamps are further in the past than the first threshold (e.g., 2 minutes).

At operation 408, if the clock drift exceeds the first threshold (past threshold), the health marker service may trigger recycling operations.

At operation 410, if the clock drift did not exceed the first threshold, the health marker service determines whether the one or more timestamps exceed a second threshold associated with clock drift in the future. For example, the health marker service may determine whether the one or more timestamps are further in the future than the second threshold (e.g., 30 seconds).

If the clock drift exceeds the second threshold (future threshold), the health marker service may trigger recycling operations (operation 408). If the clock drift did not exceed the second threshold, the method 400 may return to operation 402 at its next scheduled iteration.

When a computing device, such as a compute service manager, fails, recovery operations may be executed. One example is remote recovery of a compute service manager. However, some recovery operations can lead to data corruption. Recovery operations may be triggered while computing device, which is "deemed dead" is allowed to actively commit work. This can lead to corruption incidents and failed jobs.

Next, improved recovery techniques for failed devices are described. The techniques include refinement of different states associated with a "deemed dead" computing device. There is a separation of which services are allowed to mark a dead state to mitigate risk of data corruption.

Figure 5:
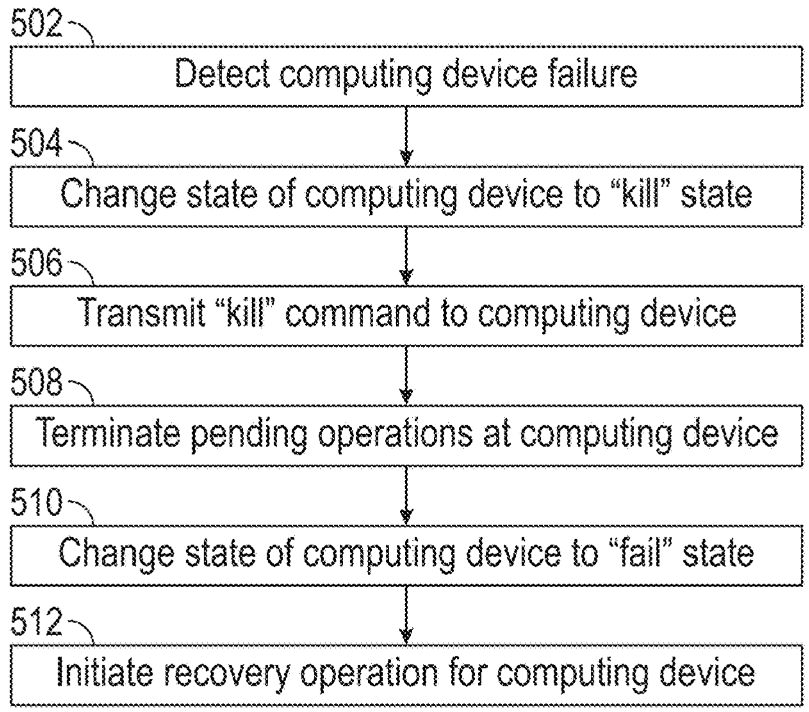
FIG. 5 is a flow diagram for a method for recovery operations that mitigate metadata corruption, according to some example embodiments of the present disclosure.

FIG. 5 is a flow diagram for a method 500 for recovery operations that mitigate metadata corruption, according to some example embodiments of the present disclosure. At operation 502, failure of a computing device is detected. A computing device, such as a compute service manager as described above, may be detected as failing based on health metrics, such as high CPU utilization, high memory usage, and/or clock drift. In some examples, lack of receiving a heartbeat for defined time (e.g., 12 minutes) may trigger detection of a failure. The detection may be performed by an internal component, such as an isolation manager, as described above, or an external component, such as a health marker service, as described above.

At operation 504, the state of the detected computing device is changed to a "kill" state. The state of the detected computing device may be changed to "kill" state by a health marker service in a metadata store. At operation 506, a "kill" command is transmitted to the detected computing device. The kill command may be transmitted by a remote call, such as a gRPC.

At operation 508, the computing device terminates pending operations in response to receiving the kill command. The computing device may terminate pending jobs. For example, java virtual machine (JVM) processes are terminated. At operation 510, the state of the computing device is changed to a "failed" state. After all pending operations are terminated, the state of the computing device can be changed without risk of another computing instance executing the same operation (e.g., job), thus leading to metadata corruption. At operation 512, recovery of metadata from the computing device is initiated. For example, a remote recovery operation may be initiated to clean up metadata written to the metadata store by the respective computing device. The failed computing device may have written metadata to the metadata database, which can be used for coordination with other computing devices, such as metadata regarding instance lock, failed jobs/tasks, provisioning service setup keys. A remote device, such as a computing device in a background cluster, may clean up that metadata, for example, by remote deleting those metadata entries.

In view of the disclosure above, various examples are set forth below. It should be noted that one or more features of an example, taken in isolation or combination, should be considered within the disclosure of this application.

Example 1. A method comprising: receiving one or more timestamps associated with outputs of a computing device in a network-based data system in a defined time interval; comparing the one or more timestamps to a reference clock based on a first threshold to determine whether the computing device has a future clock drift; and based on at least one of the one or more timestamps exceeding the threshold, triggering a recycling operation for the computing device.

Example 2. The method of example 1, The system of claim 1, wherein the threshold is a first threshold, and the method further comprising: based on the one or more timestamps not exceeding the first threshold, comparing the one or more timestamps to the reference clock based on a second threshold to determine whether the computing device has a past clock drift; and based on at least one of the one or more timestamps exceeding the second threshold, triggering the recycling operation for the computing device.

Example 3. The method of any of examples 1-2, wherein the second threshold is greater than the first threshold.

Example 4. The method of any of examples 1-3, wherein the one or more timestamps are received from a metadata database in the network-based data system.

Example 5. The method of any of examples 1-4, wherein the recycling operation comprises: changing a state of the computing device to a kill state; transmitting a kill command to the computing device; and terminating pending operations at the computing device in response to receiving the kill command.

Example 6. The method of any of examples 1-5, wherein the recycling operation further comprises: changing the state of the computing device to a fail state; triggering a recovery operation for the computing device, the recovery operation comprising cleaning metadata associated with the computing device stored in a metadata database.

Example 7. The method of any of examples 1-6, wherein the kill command is transmitted from a central health service to the computing device using a remote call.

Example 8. A system comprising: one or more hardware processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

Figure 6:
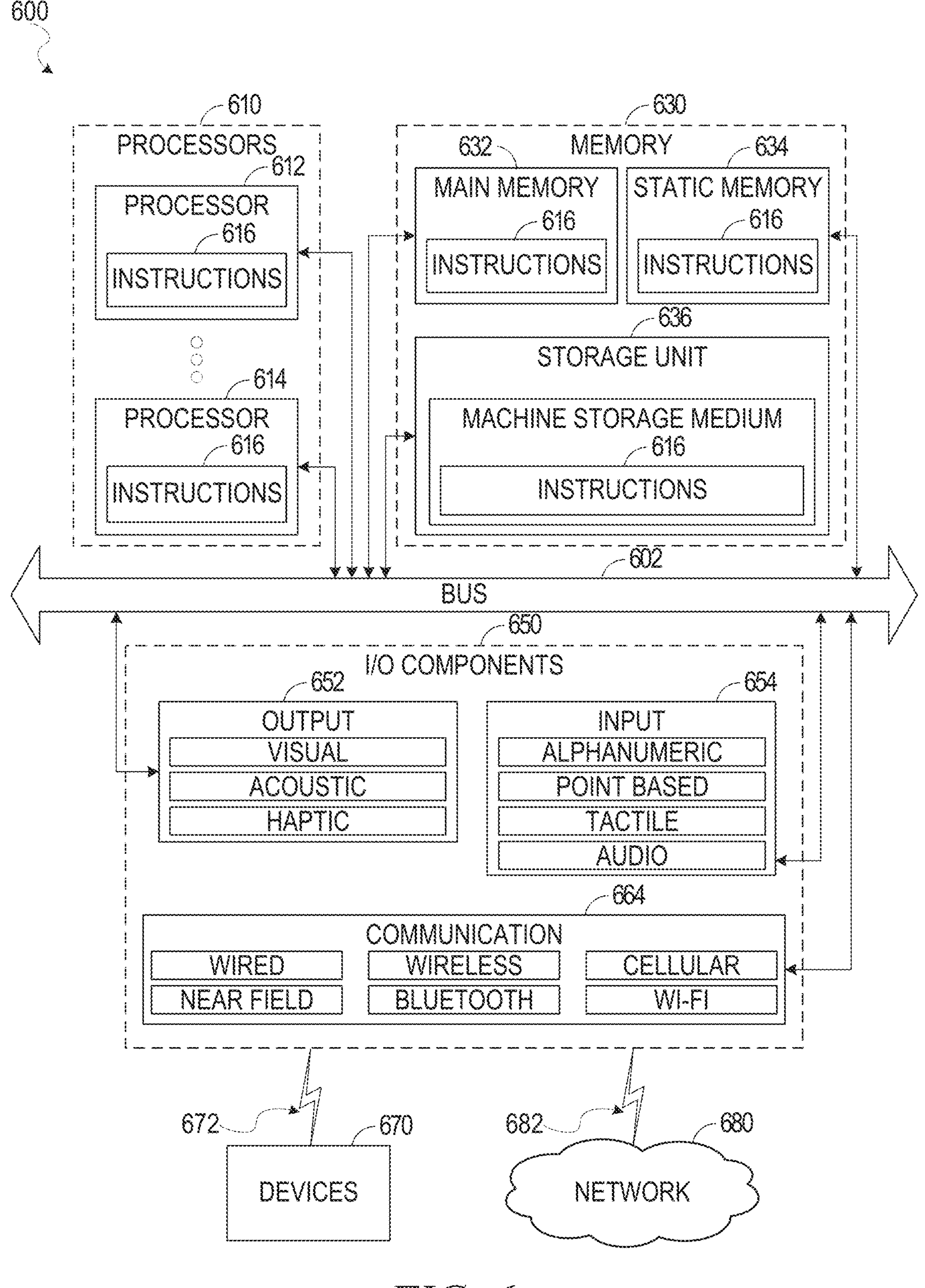
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., a software, a program, an application, an applet, an app, or other executable code) for causing the machine 600 to perform any one or more of the methodologies discussed herein may be executed. For example, the instructions 616 may cause the machine 600 to execute any one or more operations of the methods described herein. As another example, the instructions 616 may cause the machine 600 to implement any one or more portions of the functionality illustrated in any one of FIGS. 1, 2, and 3. In this way, the instructions 616 transform a general, non-programmed machine into a particular machine that is specially configured to carry out any one of the described and illustrated functions of the cloud data platform 102 such as the compute service manager 108 (or a component thereof, such as the isolation manager 109) or an execution node of the execution platform 110.

In some embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and I/O components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 614 and a processor 612 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654.

The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)). For example, as noted above, the machine 600 may correspond to any one of the compute service manager 108, the execution platform 110, and the devices 670 may include the data store 206 or any other computing device described herein as being in communication with the cloud data platform 102 or the data storage 104.

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth.

The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 400 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one hardware processor; and at least one memory storing instructions that cause the at least one hardware processor to perform operations comprising:

receiving one or more timestamps associated with outputs of a computing device in a network-based data system in a defined time interval;

comparing the one or more timestamps to a reference clock based on a first threshold to determine whether the computing device has a future clock drift;

based on at least one of the one or more timestamps exceeding the first threshold, triggering a recycling operation for the computing device;

based on the one or more timestamps not exceeding the first threshold, comparing the one or more timestamps to the reference clock based on a second threshold to determine whether the computing device has a past clock drift; and based on at least one of the one or more timestamps exceeding the second threshold, triggering the recycling operation for the computing device.

2. The system of claim 1, wherein the second threshold is greater than the first threshold.

3. The system of claim 1, wherein the one or more timestamps are received from a metadata database in the network-based data system.

4. The system of claim 1, wherein the recycling operation comprises:

changing a state of the computing device to a kill state;

transmitting a kill command to the computing device; and terminating pending operations at the computing device in response to receiving the kill command.

5. The system of claim 4, wherein the recycling operation further comprises:

changing the state of the computing device to a fail state;

triggering a recovery operation for the computing device, the recovery operation comprising cleaning metadata associated with the computing device stored in a metadata database.

6. The system of claim 4, wherein the kill command is transmitted from a central health service to the computing device using a remote call.

7. A method comprising:

receiving one or more timestamps associated with outputs of a computing device in a network-based data system in a defined time interval;

comparing the one or more timestamps to a reference clock based on a first threshold to determine whether the computing device has a future clock drift;

based on at least one of the one or more timestamps exceeding the first threshold, triggering a recycling operation for the computing device;

based on the one or more timestamps not exceeding the first threshold, comparing the one or more timestamps to the reference clock based on a second threshold to determine whether the computing device has a past clock drift; and based on at least one of the one or more timestamps exceeding the second threshold, triggering the recycling operation for the computing device.

8. The method of claim 7, wherein the second threshold is greater than the first threshold.

9. The method of claim 7, wherein the one or more timestamps are received from a metadata database in the network-based data system.

10. The method of claim 7, wherein the recycling operation comprises:

changing a state of the computing device to a kill state;

transmitting a kill command to the computing device; and terminating pending operations at the computing device in response to receiving the kill command.

11. The method of claim 10, wherein the recycling operation further comprises:

changing the state of the computing device to a fail state;

triggering a recovery operation for the computing device, the recovery operation comprising cleaning metadata associated with the computing device stored in a metadata database.

12. The method of claim 10, wherein the kill command is transmitted from a central health service to the computing device using a remote call.

13. Computer-storage media comprising instructions that, when executed by one or more processors of a machine, configure the machine to perform operations comprising:

receiving one or more timestamps associated with outputs of a computing device in a network-based data system in a defined time interval;

comparing the one or more timestamps to a reference clock based on a first threshold to determine whether the computing device has a future clock drift;

based on at least one of the one or more timestamps exceeding the first threshold, triggering a recycling operation for the computing device;

based on the one or more timestamps not exceeding the first threshold, comparing the one or more timestamps to the reference clock based on a second threshold to determine whether the computing device has a past clock drift; and based on at least one of the one or more timestamps exceeding the second threshold, triggering the recycling operation for the computing device.

14. The computer-storage media of claim 13, wherein the second threshold is greater than the first threshold.

15. The computer-storage media of claim 13, wherein the one or more timestamps are received from a metadata database in the network-based data system.

16. The computer-storage media of claim 13, wherein the recycling operation comprises:

changing a state of the computing device to a kill state;

transmitting a kill command to the computing device; and terminating pending operations at the computing device in response to receiving the kill command.

17. The computer-storage media of claim 16, wherein the recycling operation further comprises:

changing the state of the computing device to a fail state;

triggering a recovery operation for the computing device, the recovery operation comprising cleaning metadata associated with the computing device stored in a metadata database.

18. The computer-storage media of claim 16, wherein the kill command is transmitted from a central health service to the computing device using a remote call.

* * * * *